United States Patent

[11] 3,596,791

[72] Inventors Nils O. Olsson
 Ancaster, Ontario, Canada;
 Roy C. Anderson, Barrington, Ill.
[21] Appl. No. 5,066
[22] Filed Jan. 22, 1970
[45] Patented Aug. 3, 1971
[73] Assignee International Harvester Company
 Chicago, Ill.

[54] GRAIN DRILLS-LIQUID FERTILIZER TANK
 8 Claims, 6 Drawing Figs.
[52] U.S. Cl. .................................................... 220/20,
 220/22, 222/176
[51] Int. Cl. .................................................... B65g 1/06,
 B65d 25/02
[50] Field of Search ............................................ 220/16, 17,
 20, 22, 23.83; 222/129, 132, 145, 176, 177, 505

[56] References Cited
UNITED STATES PATENTS
| 2,299,702 | 10/1942 | Mosel | 220/20 |
| 2,959,328 | 11/1960 | Palmer | 222/176 |
| 3,064,861 | 11/1962 | Reynolds | 222/505 X |
| 3,425,599 | 2/1969 | Sammarco | 222/177 |

FOREIGN PATENTS
| 274,274 | 7/1927 | Great Britain | 220/20 |

Primary Examiner—George Lowrance
Attorney—Noel G. Artman

ABSTRACT: An elongated removable liquid-dispensing tank for a grain drill hopper or the like adapted to store seed or dry fertilizer, is made of relatively rigid material and is adapted to be inserted through the top opening and to be fully enclosed in the hopper. The tank has at least one wall conforming to the shape of one of the walls of the hopper and divides the latter into separate compartments so that liquid and dry material can be simultaneously dispensed from the single hopper.

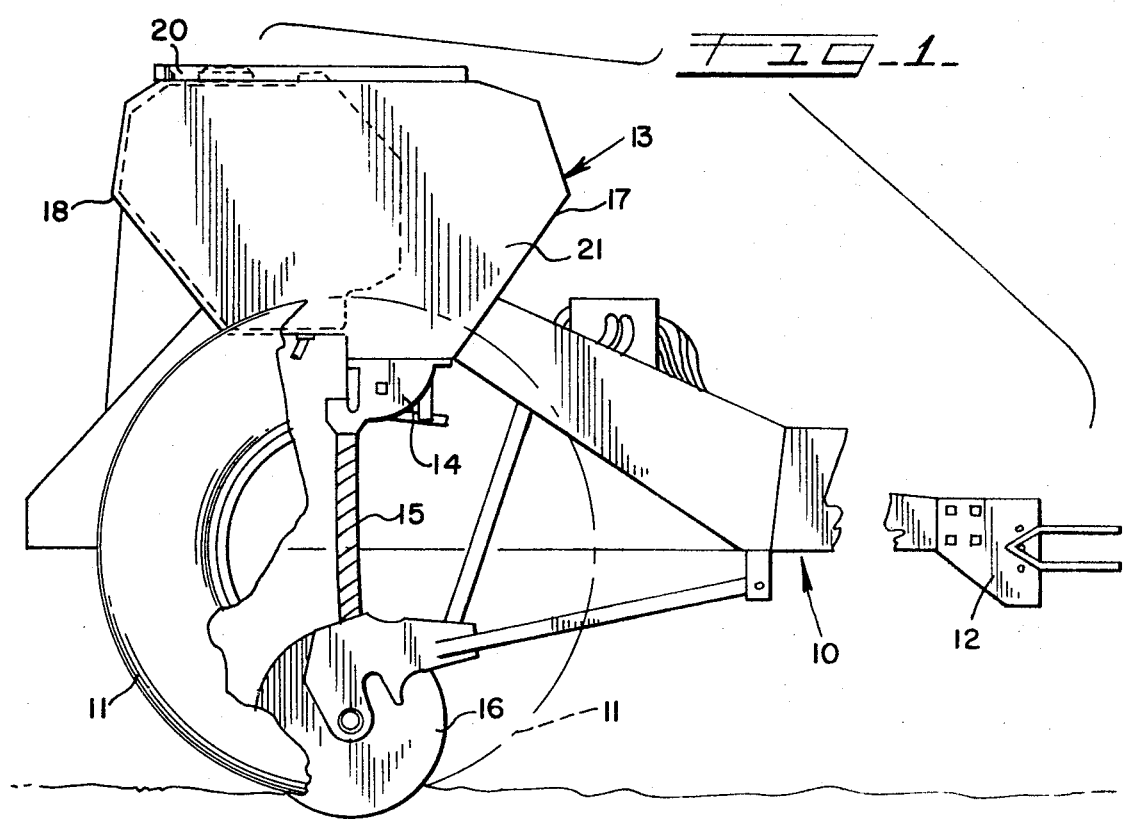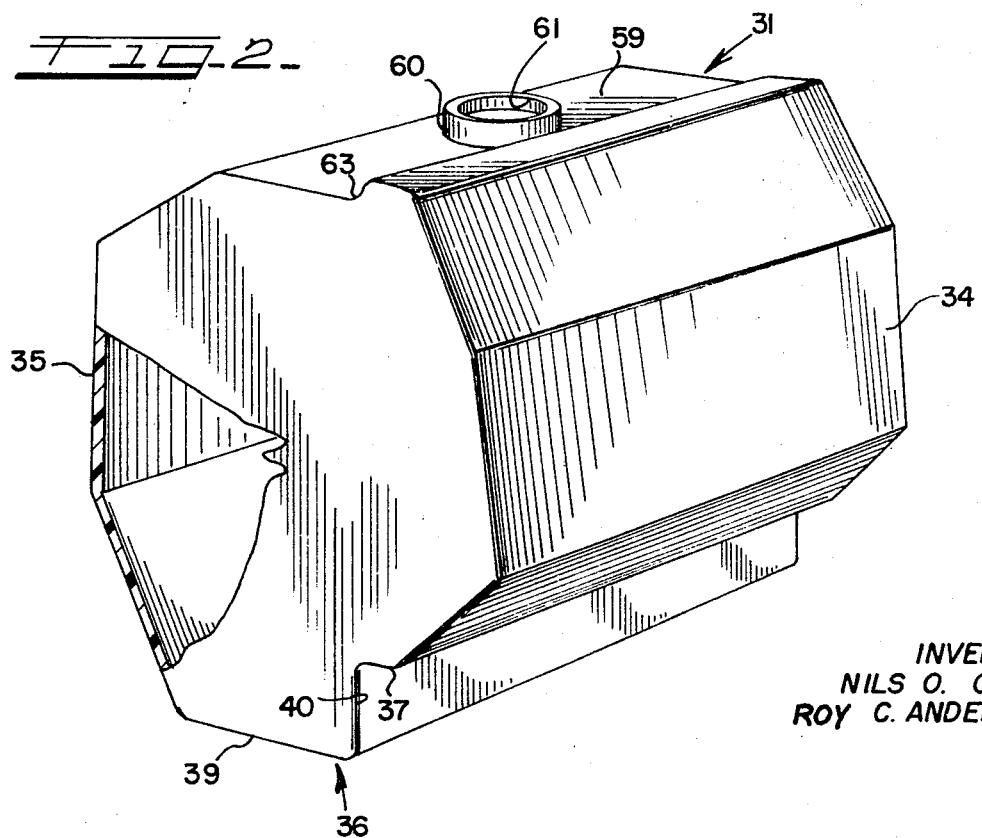

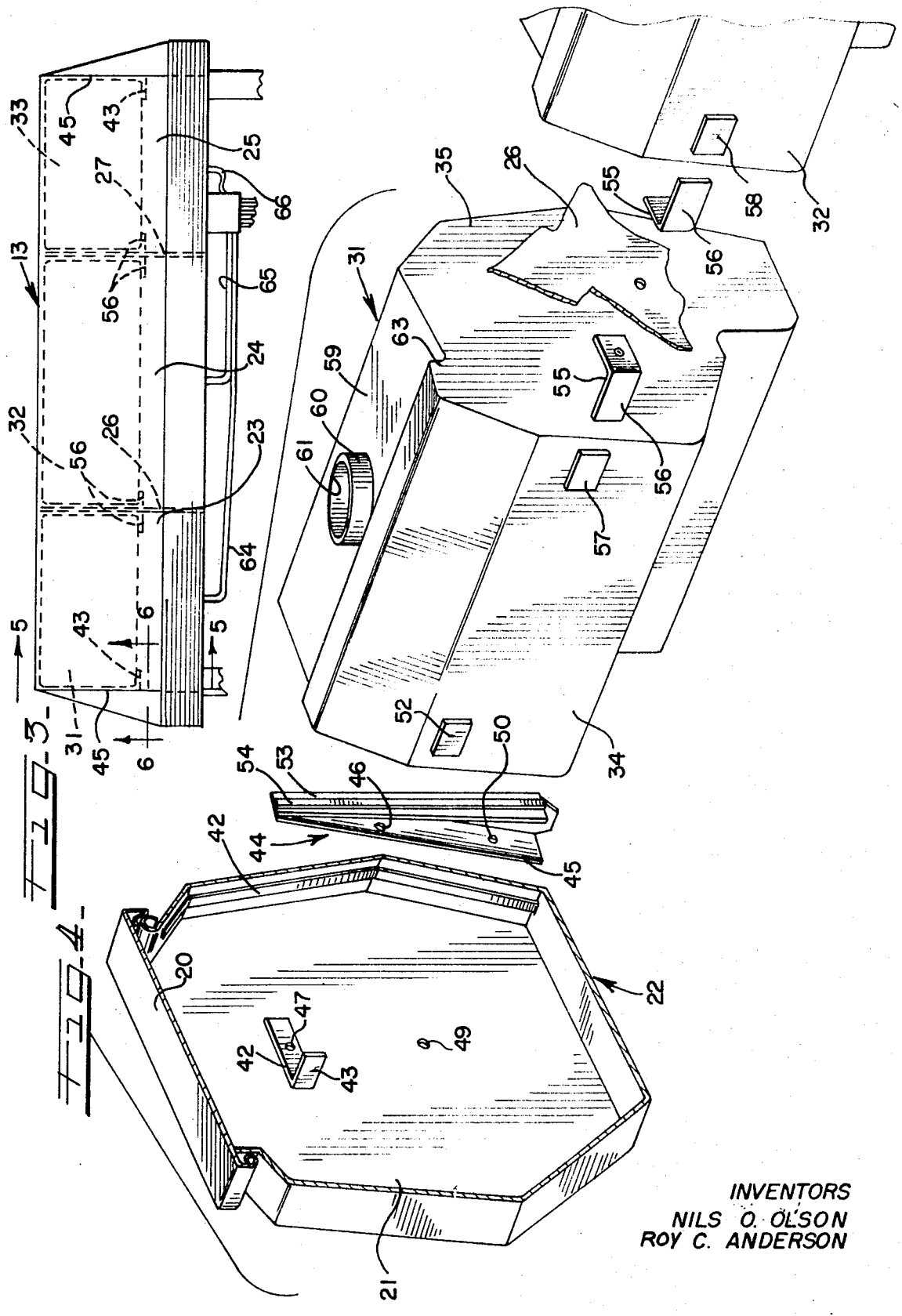

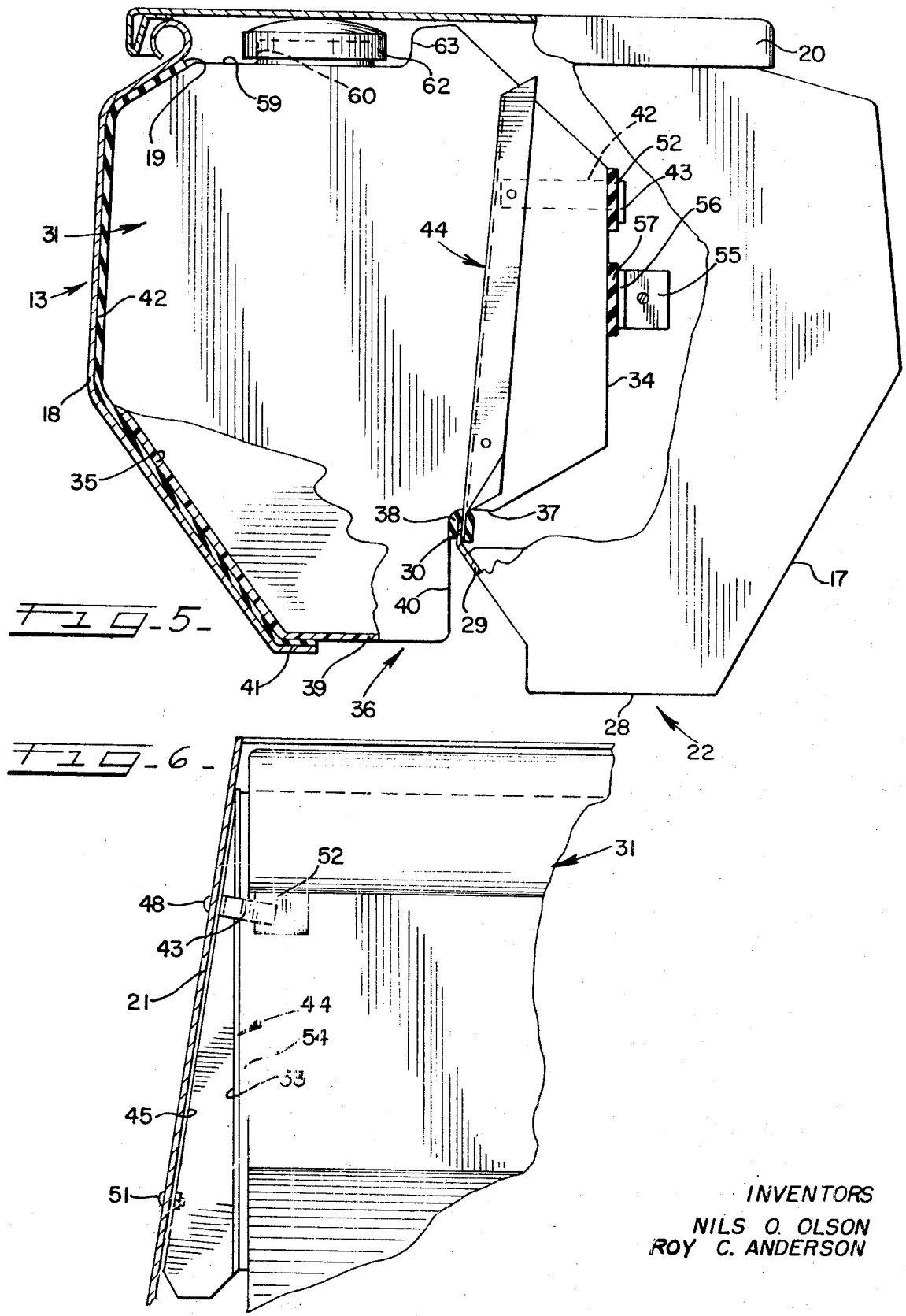

3,596,791

GRAIN DRILLS-LIQUID FERTILIZER TANK

BACKGROUND OF THE INVENTION

This invention relates to agricultural implements and particularly to grain drills and the like. More specifically, the invention concerns novel means for converting a grain drill hopper to a combination hopper adapted to dispense both dry material such as seed, and liquid treating material such as fertilizer, simultaneously.

The trend in modern farming is toward flexibility of design of an implement so that by simple conversion an implement intended for one purpose may be used to perform several functions. A grain drill, for example, includes an elongated hopper from which seed is dispensed and which is frequently divided by a partition into lengthwise compartments, one adapted to store seed and other dry fertilizer, to be dispensed simultaneously, thus avoiding the need for two implements, one to plant and the other to fertilize. However, the trend toward the use of liquid fertilizer and the like simultaneously with planting has been met by providing expensive and separate unsightly liquid-carrying tanks mounted on supports secured to the drill frame. This and other disadvantages are avoided by the present invention by the novel but simple expedient of forming a liquid-carrying tank of relatively rigid material such as fiber glass in such a way that it can be inserted, when desired, through the top opening in the drill hopper, so that one wall of the tank will conform to the shape of one wall of the hopper and the other wall of the tank will constitute the dividing walls separating the hopper into two compartments, in the other of which may be stored seed or other dry material. Thus, the liquid fertilizer tank is completely enclosed and the clean appearance of the drill is retained. When it is desired to dispense seed alone, the liquid fertilizer tank is easily lifted from the hopper and the latter filled with seed, or by the simple installation of a conventional dividing wall the hopper can be divided into two compartments with seed in one and dry fertilizer in the other.

Therefore, the principle object of the present invention is the provision of economical and efficient means for quickly and easily converting a grain drill hopper or the like to a combination hopper from which both liquid and dry material can be dispensed.

DESCRIPTION OF THE DRAWINGS

FIG. 1 is a diagrammatic end elevation, partly broken away and with parts removed, of a grain drill having a combination hopper incorporating the features of this invention;

FIG. 2 is a perspective view of a liquid-containing tank insert for a grain drill hopper;

FIG. 3 is a diagrammatic view of a grain drill hopper divided into three sections to hold three liquid tank inserts;

FIG. 4 is an exploded view, partly in section, of one of the tanks shown in FIG. 1;

FIG. 5 is an enlarged sectional view of the drill hopper and liquid tank insert on the line 5-5 of FIG. 3; and FIG. 6 is a section taken on the line 6-6 of FIG. 3 partly broken away.

DESCRIPTION OF THE PREFERRED EMBODIMENT

FIG. 1 illustrates a typical grain drill having a transversely elongated supporting frame 10 carried by supporting wheels 11. The grain drill has a hitch structure 12 by which the implement is connectable to a tractor. An elongated hopper 13 is mounted on frame 10 and discharges grain to conventional metering means 14 from which it is lead through flexible tubes 15 to a plurality of disc furrow openers 16 adapted to form a furrow in which the seed is deposited. It may be understood that when it is desired to utilize hopper 13 to dispense both seed and dry fertilizer, the hopper is separated into front and rear compartments by a lengthwise-dividing wall, or the hopper may be separated into three sections by longitudinally extending baffles in the manner diagrammatically indicated in FIG. 3, and each section divided into forward and rearward compartments.

The hopper 13 is roughly hexagonal in cross section with a forward wall 17, a rear wall 18, and opening 19 in the top and a lid 20 covering the opening. End walls 21 are inclined outwardly and downwardly whereby the bottom 22 of the hopper is longer than the top.

As indicated in FIG. 3, hopper 13 is preferably separated into three compartments 23, 24 and 25 by the provision of dividing walls 26 and 27, the length of central compartment 24 being somewhat longer than end compartments 23 and 25.

In FIG. 5 it will be noted that the hopper bottom 22 is interrupted in well known manner, the lower end of forward wall 17 being directed rearwardly to provide a bottom portion 28 the rear end of which angles upwardly and rearwardly to form a supporting member 29 having a vertical flange 30. When it is desired to utilize the hopper 13 for dispensing both grain and dry fertilizer, flange 13 serves for the anchoring of the lower end of a wall to divide the hopper lengthwise into front and rear compartments. In order for hopper 13 to serve for the dispensation of both grain and liquid fertilizer or the like, liquid-holding tanks 31, 32, and 33 are provided, one for each of the compartments 23, 24 and 25, respectively. Inasmuch as, except for the greater length of central tank 32, these tanks are substantial duplicates, a description of one will suffice for all.

It will be noted that tank 31 has a forward wall 34 and a rear wall 35, the latter being contoured to mate with the inner surface of wall 18 of the hopper, and a bottom 36 formed with a portion 37 resting upon a rubber cushion 38 covering flange 30 of support 29, and a downwardly offset lower bottom portion 39 joined to portion 37 by a vertical wall 40, bottom portion 39 resting upon an inwardly turned bottom portion 41 of the hopper. In FIG. 5 it will be observed that rear wall 35 and bottom portion 39 of tank 31 is insulated from the hopper by the provision therebetween of a cushion 42 of rubber, or the like.

Due to the width of the opening at the top of the hopper the tanks 31, 32, and 33 are easily inserted therethrough to convert the hopper for the simultaneous dispensing of dry and liquid material. As shown in FIG. 5, tank 31 fits against the rear wall 18 and is supported by parts 30 and 41. In order to hold the liquid tank 31 firmly in the hopper while accommodating ready removal thereof, angle brackets 42 having inwardly directed flanges 43 are each removably mounted on an end wall 21 to the intermediary of a triangular filler member 44, one side 45 of which is provided with an opening 46 registrable with an opening 47 and bracket 42 and secured to wall 21 by a bolt 48, additional registering openings 49 and 50 being adapted to receive a bolt 50. Flange 43 engages a cushion 52 of rubber or the like secured to the forward wall 34 of tank 31. As shown in FIG. 6, the vertical side 53 of triangular member 44 is disposed parallel to and adjacent one end of tank 31 and has secured thereto a cushion 54 engageable with the tank.

Additional brackets 55 are secured to dividers 26 and 27 and are provided with inwardly directed flanges 56 one of which is engageable with a cushioning pad 57 also secured to wall 34 of tank 31. Flange 56 projecting from the face of divider 26 opposite tank 31 engages a pad 58 similar to pad 52, as indicated in FIG. 4.

It will be noted that a top portion 59 of tank 31 is provided with a raised neck 60 defining a filler opening 61 for introducing liquid fertilizer and the like into the tank after it has been installed in the hopper. Neck 60 projects upwardly into the lid 20 and is provided with a closure cap 62. The forward portion of the top 59 is offset upwardly to provide a shoulder 63 to prevent fluid spillage over the top of the tank into the grain compartment, fluid seals being provided by the cushions 42 at the rear side of the hopper and by strip 54 on fillers 44.

Fluid is discharged in any conventional manner from the bottoms of tanks 31, 32, and 33 through suitable outlets provided in bottom portions 39 and directed through tubes 64, 65, and 66 and to metering means, not shown. The tanks are preferably made of a lightweight corrosion-resistant material such as fiber glass and having a volume determined by the proportion of liquid fertilizer desired for the volume of grain carried by the hopper.

What We claim is:

1. In an elongated material-dispensing hopper for dry material such as seed and the like having elongated front and rear walls, generally upright ends, an opening in the top for filling the hopper and a lid covering the opening, the combination of a relatively rigid tank for liquid fertilizer and the like having one wall conforming generally to the shape of one of the walls of said hopper and removably insertable through said opening for disposition adjacent said one of the hopper walls lengthwise of the hopper, the volume of said tank being less than that of the hopper to accommodate the dispensing of both liquid and dry material simultaneously from said hopper.

2. The invention set forth in claim 1, wherein vertical dividers are mounted in the hopper providing a plurality of compartments and a smaller liquid-dispensing tank is insertable in each of said compartments to occupy a portion of the volume thereof.

3. The invention set forth in claim 1, wherein dry material is insertable in the hopper through said opening and a filler hole is provided in the top of said tank for filling the tank through said hopper opening.

4. The invention set forth in claim 3, wherein the portion of the hopper in which said liquid tank is mounted is separated therefrom by resilient material.

5. The invention set forth in claim 4, wherein said hopper is generally hexagonal in section and said one wall of said tank is hexagonal to conform to the shape of said one of said hopper walls.

6. The invention set forth in claim 5, wherein the ends of said tanks are vertical and the ends of said hopper are inclined outwardly and downwardly and a triangular filler member is receivable in each end of the hopper having a vertical wall adjacent the vertical wall of the tank.

7. The invention set forth in claim 6, wherein abutment means is provided in said hopper and engageable with said tank to prevent displacement thereof in the hopper.

8. The invention set forth in claim 7, wherein said abutment means comprises brackets removably mounted in the hopper and having parts engageable with said tank to hold it against said one wall of the hopper.